(12) United States Patent
Claras

(10) Patent No.: US 6,990,649 B2
(45) Date of Patent: Jan. 24, 2006

(54) METHOD TO CONFIGURE AND QUOTE COMPONENT ARRAYS

(76) Inventor: John Claras, 1262 Lawrence Station, Sunnyvale, CA (US) 94089

( * ) Notice: Subject to any disclaimer, the term of this patent is extended or adjusted under 35 U.S.C. 154(b) by 580 days.

(21) Appl. No.: 09/816,718

(22) Filed: Mar. 21, 2001

(65) Prior Publication Data
US 2002/0138609 A1    Sep. 26, 2002

(51) Int. Cl.
G06F 17/50    (2006.01)

(52) U.S. Cl. .............................. 716/11; 716/1; 345/689

(58) Field of Classification Search ................... 716/1, 716/11; 707/100–101; 709/201, 203; 345/734, 345/736, 689
See application file for complete search history.

(56) References Cited

U.S. PATENT DOCUMENTS 5,684,967 A * 11/1997 McKenna et al. ........... 345/853
5,717,846 A *  2/1998 Iida et al. .................... 345/474
5,768,552 A *  6/1998 Jacoby ........................ 345/441
5,845,124 A * 12/1998 Berman ........................ 703/2
6,088,665 A *  7/2000 Burns et al. ................. 702/188
6,473,794 B1 * 10/2002 Guheen et al. .............. 709/223
6,646,656 B1 * 11/2003 Walker et al. ............... 345/734

* cited by examiner

Primary Examiner—Stacy A. Whitmore
(74) Attorney, Agent, or Firm—Robert Samuel Smith (57) ABSTRACT

A program adaptable for designing, configuring and quoting in real time a large array of components and interconnects such as a network of connectors and conductors. The program receives information from a user regarding the general layout and parameters of operation of the array and the program then proceeds to create a drawing of the array using parameters and specifications supplied by the user in response to pull down menus which are part of the program. In one version the program is installed on one a server file accessible by a client through a service provider. The program includes a table of available components and interconnects which are conveniently presented on the client monitor as a pull down menu from which the client can type in his selections via the keyboard or make a selection from a list using the mouse.

59 Claims, 4 Drawing Sheets

A. Composing a schematic representation

B. Compiling a list of available interconnects

C Compiling a list of component variables

D. Matching each component with a vendor part number

C.) Assigning component value to each component variable

D. Compiling a list of interconnect variables

E. Assigning to interconnect value to each interconnect variable

F. Generate a drawing of the network

FIG. 1

A. Composing a schematic representation

B. Compiling a list of available interconnects

C Compiling a list of component variables

D. Matching each component with a vendor part number

C.) Assigning component value to each component variable

D. Compiling a list of interconnect variables

E. Assigning to interconnect value to each interconnect variable

F. Generate a drawing of the network

Fig. 2

PREPARE SCHEMATIC

COMPILE NETWORK COMPONENT VARIABLES

INSPECT TABLE OF AVAILABLE COMPONENTS

ASSIGN COMPONENT VALUES

COMPILE NETWORK COMPONENT VARIABLES

INSPECT TABLE OF AVAILABLE INTERCONNECTS

ASSIGN INTERCONNECT VALUES

CREATE DRAWING

CREATE BILL OF MATERIALS

GENERATE SCHEDULE OF DELIVERIES

CONNECT SERVER, PROVIDER, CLIENT

INSTALL BROWSER

INSTALL PROGRAM ON SERVER

INITIATE PROGRAM

ENTER INTERCONNECTS AND COMPONENTS

GENERATE NETWORK DRAWINGS

COMPILE BILL OF MATERIALS

METHOD TO CONFIGURE AND QUOTE COMPONENT ARRAYS

FIELD OF INVENTION

This invention relates to arrays of components including auto and airplane assemblies, equipment, harnesses, and particularly to a real time apparatus that configures and quotes items on the internet using inputs from users in a graphic user interface to design and develop drawings, schematics, costs, bills of material for arrays of components and particularly cable assemblies.

BACKGROUND AND INFORMATION DISCLOSURE

As modern systems related to manufacturing in many areas (e.g., telecommunications, power, etc.) become more complex, greater reliance must be placed on computer based methods to perform the tasks of system design and related procurement programs.

A number of disclosures have been described indicating the demand to meet this need.

For example, U.S. Pat. No. 6,006,216 to Griffin discloses logical data architecture for fetch intensive data base applications including a first and second logical data base. The second data base includes materialized views over the first database. In preferred embodiments, the first data base is optimized for up date transactions and the second database is optimized for read transaction.

U.S. Pat. No. 5,138,698 to Aldrich et al discloses a method and apparatus for aiding the design of assemblies on CADAM. The purpose of the invention is to create a 3 dimensional representation of the cable assembly. A three dimensional view of the model is then selected and transferred to a two dimensional representation while retaining the aspect ratios of the cable assembly. Overall lengths of the cable selections aligned with the corresponding cable sections themselves are provided in human readable form.

U.S. Pat. No. 4,757,461 to Stohr et al discloses a method for storing data defining the work piece and tool as well as the program data defining relative movements that are used to generate polygons which represent the work piece. Stohr's apparatus is for the design and development of a three dimensional view of a part on a single computer.

SUMMARY OF THE INVENTION

It is an object of this invention to enable a user to design a an array of components where the array relates to any one of a number of industries, including telecommunications, power, automotive, airplanes, etc.

The method of this invention is particularly adaptable to the telecommunications industry. Typical projects involve construction of networks of connectors including network options presented as drawings together with a bill of materials that lists sources, prices and delivery dates.

It is a further object of this invention to go beyond the present state of the art by: providing access to the application program of this invention through the internet; wherein the user is a client on the Internet communicating with the application program of this invention stored on the web server.

This invention is directed toward a software system residing on the Internet wherein the client (user) is enabled to:

design component assemblies such as the connectors and conductors of a network assembly;

configure and quote any number of options with any number of combinations.

address the material aspects of the assembly including obtaining purchase data of components;

calculate performance data.

The software program (herein after "program") of this invention residing in the web server allows a client to take up to 16.7 million items by 16.7 million options. The upper limit can be changed by the client if needed. The invention presents, using a GUI display through the browser of choice, the design of the assembly of components. For example, in cable assemblies, data related to the harness, power cords and any current and data transferring component.

DESCRIPTION OF PREFERRED EMBODIMENTS

In the following paragraphs, there is presented what is presently believed to be an example of the best mode for carrying out the invention. The example is application of the invention to designing a cable network where the components are cable connectors interrelating to one another through conductors.

Figure 1:
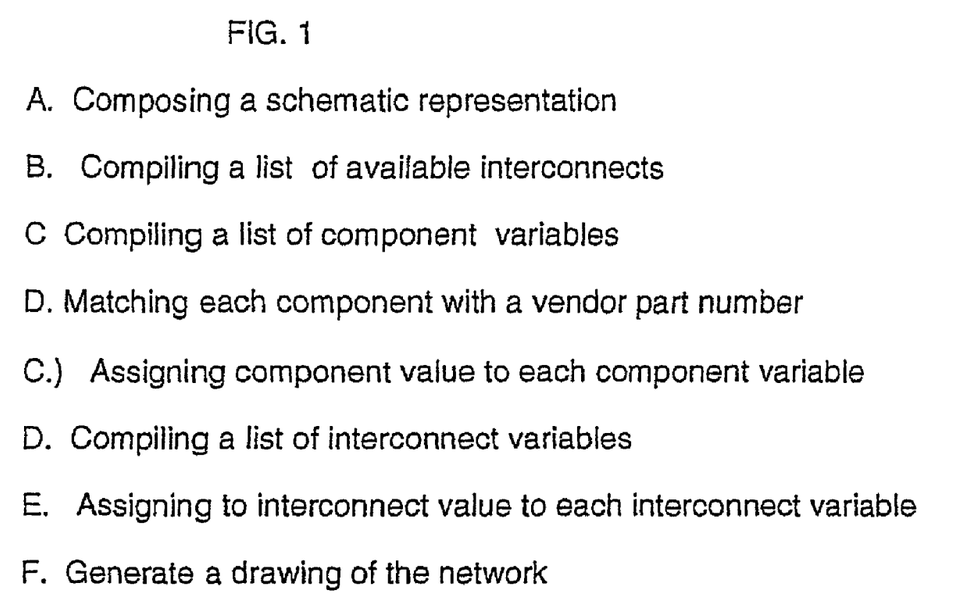
FIG. 1 is a flowchart of the base program of the method of this invention.

Turning now to a discussion of the drawings, FIG. 1 is a flow chart listing the steps in carrying out the invention which is a method for generating a drawing of a network of at least one component and a plurality of interconnects.

In step 1 a schematic representation of the network is composed showing the components linked together by interconnects.

In step 2, a list of available components is compiled including part name, vendor source, current capacity.

In step 3, component variables are listed wherein each component variable represents one of the network components, respectively;

In step 4, each component is matched with a vendor part number determined by matching anticipated performance in the network component with listed performance of an available component.

In step 5, each component variable is assigned a component value wherein each component value is at least one of:

component coordinates defining location of said network component;

component type;

vendor part number;

anticipated performance value of said network component, respectively;

In step 6, a list of interconnect variables is compiled wherein each interconnect variable represents an interconnect connecting one of said network components to another one of said network components;

In step 7, at least one interconnect value of a set interconnect values is assigned to each interconnect variable , each interconnect value corresponding to one of:

anticipated length of said respective interconnect;
current anticipated in said interconnect;
wire gage of said interconnect;
type of said interconnect;

In step 8, a drawing of the network is created representing relative locations of network components and interconnects connecting said network components wherein each network component is labeled by a respective one of the component variables and each interconnect is labeled by a respective one of the interconnect variables.

Figure 2:
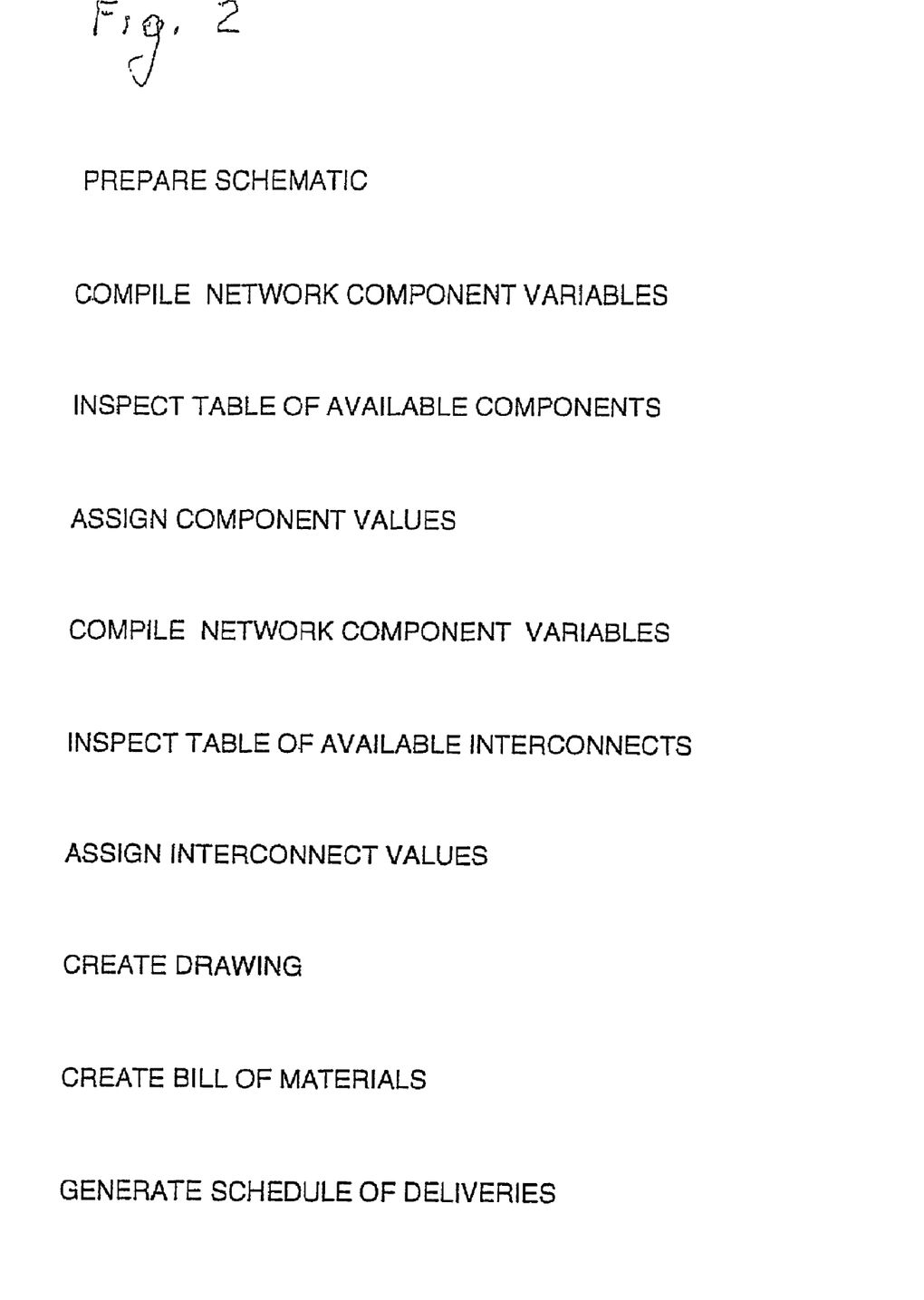
FIG. 2 is a flowchart of the program of FIG. 1 modified for installation on a computer.

In one embodiment, the program of FIG. 1 is modified for installation into a self contained computer system which provides an in-house operation. FIG. 2 is a list of instructions compiled by modifying the flow chart of FIG. 1 for adaptation to a program installed in a computer.

The computer program includes:

A. a table of component variables, each component variable corresponding to one of the network components, respectively. Each network variable is a list of values, The list of values includes at least any one of a network component identification number, an anticipated load supported by the component and coordinates specifying location of the network component.

B. a table of available components includes a part number and specifications for each available component;

C. an instruction to display on a monitor of the computer an instruction to select, from the table of available components, those part numbers of available components having specifications matching specifications of said network components and store those selected part numbers as said values of variables in said table of network components;

D a table of interconnect variables, each interconnect variable corresponding to one of the network interconnects, respectively. Each interconnect variable includes a list of values. The list of values includes at least one of a network interconnect identification number, an anticipated load supported by the network interconnect, and network components to which the network interconnect is connected;

E. a table of available interconnects listing type number and parameters of each available interconnect;

F. an instruction to display the table of available interconnects and the table of network interconnects for display on the monitor of the computer;

G. an instruction for display on the monitor an instruction to select from the table of available interconnects, those available interconnects having specifications matching specifications of the network interconnects and adding type numbers of selected available interconnects to the table of network interconnects;

an instruction to display the table of network components and the table of network components on the monitor of the computer;

H an instruction to calculate a length of each network conductor from the locations of respective network connectors and storing said calculated length with said type and parameters of said respective network conductor in the table of network conductors;

I. a configure module arranged to apply the location data of each network component and length calculated for each network interconnect to generate a representation of a drawing of the network;

J. an instruction to generate a drawing of the network for display on a monitor of the computer.

Figure 3:
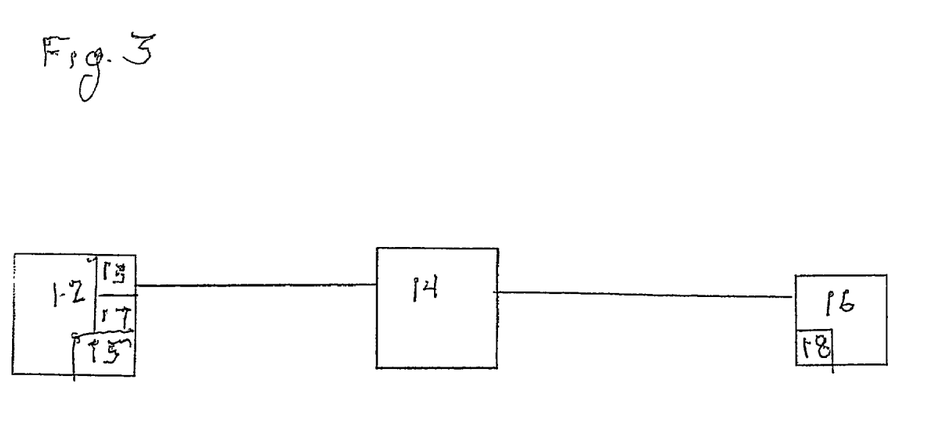
FIG. 3 is an Internet system for practicing the invention on the internet.

FIG. 3 shows another embodiment of the invention in which the program is adapted to an internet system. There are shown a client computer 12 with a monitor 13 and a printer 15. A browser program 17 is installed in the client computer 12. A service provider 14 communicates with both the client computer 12 and a server computer 16 (hereinafter server) using any one of the well known languages/protocols, e.g., (but not limited to) html language and http protocol. The network configuration program 18 of of this invention resides in the server 16, The objective of the user of the client computer 12 is to generate a complete document dfining a network of connectors and conductors. The document includes a formal (engineering) drawing, parts list, list of materials summarizing cost and schedule. The starting point of the project is a schematic drawing of the network.

Figure 4:
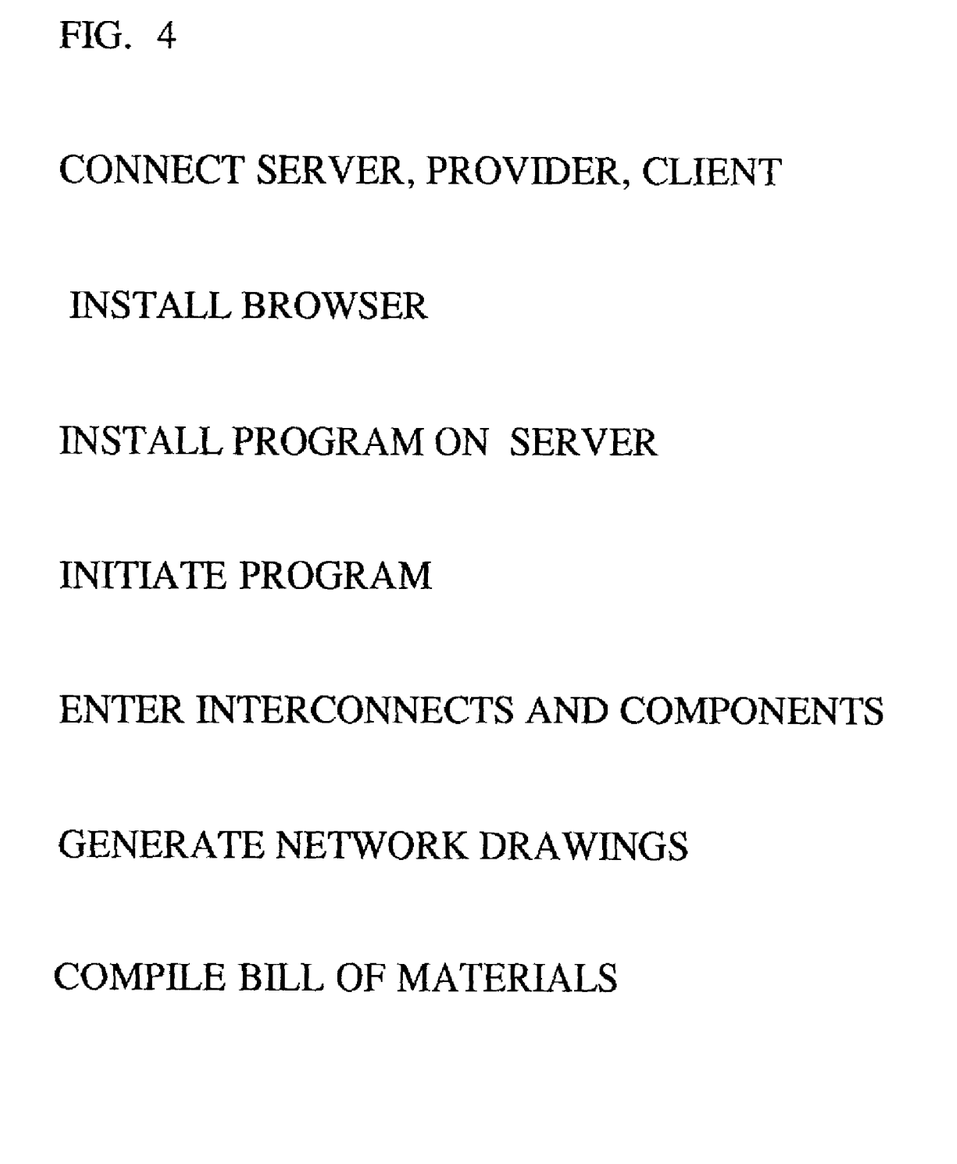
FIG. 4 is the program of this invention modified for adaptation to the internet.

FIG. 4 shows a flowchart of the steps of the method for generating the document according to the invention adapted for use on the Internet utilizing the system of FIG. 3. According to this version, a client, accessible to a client computer, is enabled to communicate with a server computer to generate a drawing of a network of at least one interconnect and a plurality of components.

In step 1, a server computer is connected to an internet provider connected to the client computer:

In step 2, a browser program is installed in the client computer for communication with the server computer;

In step 3, a program is installed on the server computer which includes:

a table of component variables, each component variable corresponding to one of the network components, respectively, each the network variable is a list of values, the list of values including at least one of a network component identification number, an anticipated load supported by the component, coordinates specifying location of the network component;

a table of interconnect variables, each interconnect variable corresponding to one of the network interconnecters, respectively, each interconnect variable including a list of values, the list of values including at least one of a network interconnect identification number, an anticipated load performance, network components to which the network interconnect is connected;

H an instruction to calculate a length of each network conductor from the locations of respective network connectors and storing said calculated length with said type and parameters of said respective network conductor in the table of network conductors;

I. a configure module arranged to apply the location data of each network component and length calculated for each network interconnect to generate a representation of a drawing of the network;

J. an instruction to generate a drawing of the network for display on a monitor of the computer.

FIG. 3 shows another embodiment of the invention in which the program is adapted to an internet system. There are shown a client computr 12 with a monitor 13 an a printer 15. A browser program 17 is installed in the client computer 12. A service providier 14 communicates with both the client computer 12 and a server computer 16 (hereinafter: server") uaing any of the well known languages/protocols, e.g., (but not limited to) html language and http protocol. The network configuration program 18 of this invention resides in the server 16. The objective of the user of the client computer 12 is to generate a complete document defining a network of connectors and conductors. The document includes a formal (engineering) drawing, parts list, list of materials summarizing cost and schedule. The starting point of the project is an invormalshematic drawing of the network.

a table of available interconnects listing type number and parameters of each available interconnect;

a table of available components including a part number and specifications for each available component;

an instruction to transmit, to the browser, the table of available components and the table of network components;

an instruction for transmission to the browser to display on the client computer an instruction to select from the table of available component part numbers, available components having specifications matching specifications, an instruction to transmit, to the browser, the table of available interconnects and the table of network interconnects for display on the client computer;

an instruction, for display to the client, an instruction directing the client to select from the table of available interconnects, those available interconnects having specifications matching specifications of the network interconnects and adding type numbers of selected available interconnects to said table of network interconnects;

an instruction to the browser to transmit the table of network interconnects and table of network components from the client computer back to the server computer;

an instruction to calculate a length of each network interconnect from the location of respective network components and storing the calculated length with the type and parameters of the respective network interconnect in the table of network interconnects;

a configure module arranged to apply the location data of each network connector and length calculated for each network conductor to generate a representation of a drawing of the network;

an instruction transmitting the representation of a drawing to the browser whereby the browser generates a drawing of the network for display on a monitor of the client computer.

In step 4, an instruction to initiate the program is transmitted from the client computer through the browser to the server computer.

In step 5, the client adds selected part numbers of available components and type numbers of available interconnects to the tables of network components and interconnects respectively in response to prompt displayed by the client computer.

In step 6, in response to step 5, a drawing of the network is displayed by the client computer.

In step 7, a bill of materials is generated including a cost of the network determined by summing the cost of all of the components and interconnects.

Variations and modifications of the flow charts in FIGS. 1–4 may be introduced which are within the scope of the invention.

In applying the method of the invention to cable networks, the connectors are regarded as components, the conductors are regarded as interconnects between components.

In step 1 a schematic representation of the network is composed showing the conductors linked together by the connectors.

In step 2, a list of available conductors is compiled including part name, vendor source, current capacity.

In step 3, connector variables are listed wherein each connector variable represents one of the network connectors, respectively;

In step 4, each connector is matched with a vendor part number determined by matching anticipated current in the network connector with current capacity of an available connector.

In step 5, each connector variable is assigned a connector value wherein each connector value is at least one of:

connector coordinates defining location of said network connector;

connector type;

vendor part number;

anticipated current value through said network connector, respectively;

In step 6, a list of conductor variables is compiled wherein each conductor variable represents a conductor connecting one of said network connectors to another one of said network connectors;

In step 7, at least one conductor value of a set of conductor values is assigned to each conductor variable, each conductor value corresponding to one of:

anticipated length of said respective conductor;

current anticipated in said conductor;

wire gage of said conductor;

type of said conductor;

In step 8, a drawing of the network is created representing relative locations of network connectors and conductors connecting said network connectors wherein each network connector is labeled by a respective one of the connector variables and each conductor is labeled by a respective one of the conductor variables.

In one embodiment, the program of FIG. 1 is modified for installation into a self contained computer system which provides an in-house operation. FIG. 2 is a list of instructions compiled by modifying the flow chart of FIG. 1 for adaptation to a program installed in a computer.

The computer program includes:

A. a table of connector variables, each connector variable corresponding to one of said network connectors, respectively. Each network variable is a list of values, The list of values includes at least any one of a network connector identification number, an anticipated current load through said connector and coordinates specifying location of the network connector.

B. a table of available connectors includes a part number and specifications for each available connector;

C. an instruction to display on a monitor of the computer an instruction to select, from the table of available connectors, those part numbers of available connectors having specifications matching specifications of said network connectors and store those selected part numbers as said values of variables in said table of network connectors;

D a table of conductor variables, each conductor variable corresponding to one of the network conductors, respectively. Each conductor variable includes a list of values. The list of values includes at least one of a network conductor identification number, an anticipated current load through the network conductor, network connectors to which the network conductor is connected;

E. a table of available conductors listing type number and parameters of each available conductor;

G. an instruction to display the table of available conductors and the table of network conductors for display on the monitor of the computer;

an instruction for display on the monitor an instruction to select from the table of available conductors, those available conductors having specifications matching specifications of the network conductors and adding type numbers of selected available conductors to the table of network conductors;

H. an instruction to display the table of network conductors and the table of network connectors on the monitor of the computer;

I. an instruction to calculate a length of each network conductor from the locations of respective network connectors and storing said calculated length with said type and parameters of said respective network conductor in the table of network conductors;

J a configure module arranged to apply the location data of each network connector and length calculated for each network conductor to generate a representation of a drawing of the network;

K. an instruction to generate a drawing of the network for display on a monitor of the computer.

FIG. 3 shows another embodiment of the invention, in which the program is adapted for an Internet system There are shown a client computer with a monitor and printer. A browser program is installed in the client computer. A service provider communicates with both the client computer and a server computer (hereinafter "server") using any of the well known languages/protocols, e.g., (but not limited to) html language and http protocol. The network configuration program of this invention resides in the server. The objective of the user of the client computer is to generate a complete document defining a network of connectors and conductors. The document includes a formal (engineering) drawing, parts list, bill of materials summarizing cost and schedule. The starting point of the project is an informal schematic drawing of the network.

FIG. 4 shows a flowchart of the steps of the method for generating the document according to the invention adapted for use on the Internet utilizing the system of FIG. 3. According to this version, a client, accessible to a client computer, is enabled to communicate with a server computer to generate a drawing of a network of at least one conductor and a plurality of connectors.

In step 1, a server computer is connected to an internet provider connected to the client computer:

In step 2, a browser program is installed in the client computer for communication with the server computer;

In step 3, a program is installed on the server computer which includes:

a table of connector variables, each connector variable corresponding to one of the network connectors, respectively, each the network variable is a list of values, the list of values including at least one of a network connector identification number, an anticipated current load through the connector, coordinates specifying location of the network connector;

a table of conductor variables, each conductor variable corresponding to one of the network conductors, respectively, each conductor variable including a list of values, the list of values including at least one of a network conductor identification number, an anticipated current load through the network conductor, network connectors to which the network conductor is connected;

a table of available conductors listing type number and parameters of each available conductor;

a table of available connectors including a part number and specifications for each available connector;

an instruction to transmit, to the browser, the table of available connectors and the table of network connectors;

an instruction for transmission to the browser to display on the client computer an instruction to select from the table of available connectors part numbers of available connectors having specifications matching specifications an instruction to transmit, to the browser, the table of available conductors and the table of network conductors for display on the client computer;

an instruction, for display to the client, an instruction directing the client to select from the table of available conductors, those available conductors having specifications matching specifications of the network conductors and adding type numbers of selected available conductors to said table of network conductors;

an instruction to the browser to transmit the table of network conductors and table of network connectors from the client computer back to the server computer;

an instruction to calculate a length of each network conductor from the location of respective network connectors and storing the calculated length with the type and parameters of the respective network conductor in the table of network conductors;

a configure module arranged to apply the location data of each network connector and length calculated for each network conductor to generate a representation of a drawing of the network;

an instruction transmitting the representation of a drawing to the browser whereby the browser generates a drawing of the network for display on a monitor of the client computer.

In step 4. an instruction to initiate the program is transmitted from the client computer through the browser to the server computer.

In step 5, the client adds selected part numbers of available connectors and type numbers of available conductors to the tables of network connectors and conductors respectively in response to prompt displayed by the client computer.

In step 6, in response to step 5, a drawing of the network is displayed by the client computer.

In step 7, a bill of materials is generated including a cost of the network determined by summing the cost of all of the connectors and conductors.

Application of the invention to a network of conductors and connectors can include the introduction of shielded cables. The operating frequency is selected as a conductor type requiring that operating frequency be selected as one of the values of the respective variables. Cost of shrink tubing may be added in computing a bill of materials and cost. Delivery dates may be included as part of the data enabling construction of a build schedule.

The following two examples applied to a network of conductors and connectors illustrate these and other variations of the invention.

EXAMPLE 1

A Network Assembly Design of Multiconductor Cables on the Web

This browser window is to design a network cable assembly, harness, or some combination of both.

The user selects the number of connectors to be designed and linked together in the network assembly. for example, the user will select 3, (but any number can be selected.) A pull down menu asks the user for connector type, number of circuits, wire gages, temperature, and current. Special options are available for different levels of design guidance A relational database selects the appropriate connectors. Connectors are listed with prices, supplier names and delivery times. A menu for connector detailed drawings is listed on the main menu bar. The user selects connector and a graphical representation depicting the connector is added to the drawing. The bill of materials is updated with the new connector. This process is repeated for the next two connectors. Off the tool bar is a wiring list which is a table corresponding to the number of connectors and the number of circuits within each connector. The user fills in the "from-t-" list on the table until it is complete. Notes and dimensions can be added in the tool bar. The user can add specific notes as needed and will be displayed in an area available on the drawing. The measurement system will allow the user to select either metric or U.S. Standard or both. On the dimensioning toolbar, the length for each tool bar is defined by starting points and end ending points. These lengths are displayed on the screen. Item numbers are automatically added for each connector and additional numbers can be added for other items such as shrink tubing, tie wraps, labels or other parts. Other parts such as switches or fuses are uploaded and added to the drawing. Other information is typed in manually such as part number and item description. The company logo can be added along with proprietary warnings. Names of the drawers and Approvals can be added. The drawing can be downloaded to the customer computer data-base. Finally the drawing can be printed without any translators or other types of information. Part numbers and logos can be added to the drawing with a search function for both name and number.

EXAMPLE 2

A Coaxial or Fiber Optic Assembly

The user selects the number of connectors to be designed and linked together in the coaxial assembly. For this example, the user will select two connectors, but any number can be selected.

A pull down menu asks the users:

select impedance (e.g., 50, 75, 93 ohms)

select frequency range for example:

D.C to 500 MHz,

D.C. to 2 GHz,

D.C. to 6 GHz,

D.C. to 12 GHz;

D.C. to 18 GHz;

D.C to 26 GHz;

D.C. to 40 GHz.

A dynamic graph gives the customer the cost vs. frequency chosen.

Then connector types are listed given the frequency and impedance type such as BNC, TNC, N, etc.

The client selects the connectors desired which includes subsets of the major category such as sex of the connector, and whether the connector is a bulkhead, right angle, female, flange, P.C. mount, etc. The client then selects the of circuits or branches desired. With the connector type known, the cable types are displayed e.g., RG-179 or 0.085 TP/AL Semi-rigid. Temperature and current is added in the notes section.

With this information, the search engine searches within the regional data base and selects the appropriate connectors. Connectors are listed with prices supplier names, part numbers, performance data and delivery times.

A menu for connector detailed drawings is listed in the main menu bar. The user selects a connector and a drawing depicting the connector is added to the cable assembly drawing. The Bill of material is updated with the new connector. This process is repeated for the next Connector. Off the tool bar is a schematic wiring list.

If more than two connectors are required, then the following questions are asked:

1. Is impedance balancing required?

2. Is the impedance required resistive or reactive?

A table corresponding to the number of connectors and the number of circuits within each connector. The user fills in the "from -to" list on the table until it is complete . Notes and dimensions can be added in the tool bar. Notes are subject to the user and will be displayed in an available area. Measurement system will allow the user to select either US Standard, metric or both.

On the dimensioning toolbar, the length from each connector is defined.

Calculation of insert ion loss is calculated within the toolbar using frequency data, connector data and cable data with its length. Return loss is also found under this toolbar along with VSWR (Voltage Standing Wave Ratio) conversion calculator. The lengths of the cables are displayed on the screen.

Item numbers are automatically added for each connector and additional numbers are added for each connector and additional numbers can be added for other items such as shrink tubing, tiewraps, labels or other parts. Special parts including switches and fuses are uploaded and added to the drawing. The part number and item description is typed in manually. Names of originators and approvals are added. The drawing can be downloaded to the customers data base.

Finally, the drawing is printed without translators or other types of information. After this, selection, the number of connector boxes appear on the screen.

After this selection, the connector is drawn on the screen along with the part number of the connectors.

The program of this invention is a complete enterprise wide software solution and includes:

all aspects of purchasing with smart BOM (bill of materials) learning;

all aspects of web presence including Configure and Quote TM, all aspects of shipping and receiving including interfacing to third party delivery services such as UPS;

all aspects of order entry.

The internet program is a focused web solution for any sized business, By including with the powerful Configure and Quote TM SOFTWARE MODULE included in the program, the client is enabled to create arrays that have 16.7 million products by 16.7 million options with a secure shopping cart. All aspects of the system are dynamic and easy to up date and do not require "flat files".

The program is a major advance in large complex quoting of products. The software eliminates the need for flat files or static tables with links to carts. Delimiters become dynamic with the large array software.

Fiber optics are similar to coaxial cables with different variables for cable.

The website is empowered in new ways by allowing customers to configure their selections in any one of millions of ways and still keep them in a virtual cart.

In Various Embodiments:

1. the program creates part numbers by formulas that are set by the user, removing the need for flat files. The full version enables the user to run purchasing, shipping, web transactions, and status/tracking reports all from a single system.

2. the Configure and Quote module allows the user to create quote arrays that have 16.7 products by 16.7 options with a secure shopping cart. All aspects of the system are dynamic and easy to update.

The program's front end is presented in XHTML. (Extensible Hyper Text Mark-up Language. Therefore only simple knowledge of a web browser is required to operate it. In addition, writing in XHTML enables the program to be accessed via the wireless web in the very near future.

The program is highly modulated when DOD software standards are applied so that the program is highly configurable. Therefore, new users may make changes via simple menus whereas more advanced users may manually edit the configuration files to make more advanced or radical changes.

When written in PHP (PHP Hyper text Preprocessor), the program is highly scalable when written in PHP. It will run on a 386 or a higher end SMP server, is cross platform to Linux or any other Unix platform as well as Windows NT. The program has the ability to handle as much data as the database below it.

Programs written in PHP run on a large number of platforms and can interface with many databases. PHP's high speed. most diverse data base connectivity, ease of customization, and cross platform capability makes it an ideal language for this application.

In one embodiment, the program is written in modular form to single input/output section a that comply with DOD standards. All inputs and outputs are audited for correctness by comparing against regular expressions and matching a string against a pattern. This acts as a filter against bad inputs and outputs and protects against "buffer overflow and piping" (unauthorized integration of programs by an external user). This security ensures that the program will not pass sensitive data to the user. The program is secure after a defaults installation.

The foregoing examples and descriptions illustrate the application of the invention to a wide variety of manufacturing and assembly projects. In the applications cited, the components are connectors and the interconnects are conductors of a network.

In another application, the project is an electrical system for a building and the components are the furnace, lights, airconditioning, refrigeration and the interconnects comprise the wiring of the building.

In another application, the project is a LOCAL AREA NETWORK. The components are computers and the interconnects are the connecting cables.

Other variations may be considered within the scope of the invention. I therefore wish t define the scope of my invention vy the appended claims.

I claim:

1. A method for generating a drawing of a network of at least one conductor and a plurality of connectors which includes the steps:
   A,) composing a schematic representation of said network showing said conductors linked together by said connectors;
   B.) compiling a list of available conductors including part name, vendor source, current capacity;
   C.) compiling a list of connector variables wherein each connector variable represents one of said network connectors respectively;
   D.) matching each connector with a vendor part number determined by matching anticipated current in said network connector with current capacity of an available connector;
   E.) assigning to each connector variable a connector value wherein each connector value is at least one of:
      connector coordinates defining location of said network connector;
      connector type;
      vendor part number;
      anticipated current value through said network connector, respectively;
   F.) compiling a list of conductor variables wherein each conductor variable represents a conductor connecting one of said network connectors to another one of said network connectors;
   G.) assigning to each conductor variable at least one conductor value of a set of conductor values, each conductor value corresponding to one of:
      anticipated length of said respective conductor;
      current anticipated in said conductor;
      wire gage of said conductor;
      type of said conductor;
   H.) creating a drawing of the network representing relative locations of network connectors and conductors connecting said network connectors wherein each network connector is labeled by a respective one of said connector variables and each conductor is labeled by a respective one of said conductor variables.

2. The method of claim 1 wherein said connector values include connector coordinates defining location of said network connector; and
   said step G includes the step:
   calculating said anticipated length from said connector coordinates.

3. The method of claim 2 wherein said conductor variable includes cost of said conductor; and
   said method further includes the step:
   I. compiling a vendor table listing type numbers of all available conductors, each one of said type numbers including current capacity and price per unit length of said available conductor, respectively; and
   said step G comprises:
   selecting each value of conductor type number by matching current capacity of one of said available conductors with anticipated current of said network conductor respectively;
   calculating cost of said network conductor as equal to said anticipated length multiplied by said price per unit length of said available conductor.

4. The method of claim 3 wherein said connector variable includes said part number and price and the method further includes the step in operable order:
   J. compiling a vendor table listing a part number and price of all available connectors, each one of said part numbers including operating data of said available connector respectively; and
   step D includes:
   assigning, to each network connector variable, a part number and price of an available connector from said vendor table whose current capacity equals said anticipated current through each said network connector, respectively.

5. The method of claim 4 wherein step G includes listing a price with each part number and the method includes the additional step, in operable order:
   compiling a list of prices of all network connectors and conductors;
   adding said list of prices whereby a cost of said network is provided.

6. The method of claim 2 wherein:
   said step G includes the step:
   compiling a vendor table listing type numbers of all available conductors, each one of said type numbers including current capacity respectively; and
   step E comprises:
   selecting said type number by matching type number of one of said available conductors with anticipated current network conductor to select type of said network conductor.

7. The method of claim 3 wherein said connector variable includes said part number and the method further includes the step in operable order:

I compiling a vendor table listing a part number for each of all available connectors with a detailed drawing of each available connector respectively; and step C includes:

assigning to each network variable, a part number of an available connector from said vendor table whose current capacity equals aid anticipated current through each said network connector, respectively.

8. The method of claim 1 wherein at least one of said conductors is a shielded conductor and said list of values of said conductor variables includes characteristic impedance of said shielded conductor.

9. The method of claim 1 wherein at least one of said connectors is a connector for a shielded conductor.

10. A computer program for generating a drawing of a network of at least one conductor and a plurality of connectors, which includes:

A. a table of connector variables, each connector variable corresponding to one of said network connectors, respectively, each said network variable is a list of values, said list of values including at least one of a network connector identification number, an anticipated current load through said connector, coordinates specifying location of said network connector;

B. a table of available connectors including a part number and specification for each available connector;

C. an instruction to display on a monitor of said computer, an instruction to select, from said table of available connectors, part numbers of available connectors having specifications matching specifications of said network connectors and store those selected part numbers as said values of variables, in said table of network connectors;

D. a table of conductor variables, each conductor variable corresponding to one of said network conductors respectively, each said conductor variable including a list of values, said list of values including at least one of a network conductor identification number, an anticipated current load through said network conductor, network connectors to which said network connectors to which said network conductor is connected;

E. a table of available conductors listing type number and parameters of each available conductor;

F. an instruction to display said table of available conductors and said table of network conductors for display on said monitor of said computer;

G. an instruction for display on said monitor an instruction to select from said table of available conductors, those available conductors having specifications matching specifications of said network conductors and adding type numbers of selected available conductors to said table of network conductors;

H. an instruction to display said table of network conductors and said table of network connectors on said monitor of said computer;

I. an instruction to calculate a length of each network conductor from said location of respective network connectors and storing said calculated length with said type and parameters of said respective network conductor in said table of network conductors;

J. a configure module arranged to apply said location data of each said network connector and said length calculated for each said network conductor to generate a representation of a drawing of said network;

K. an instruction to generate a drawing of said network for display on a monitor of said computer.

11. The program of claim 10 written in Hyper Text Preprocessor Language providing that said program will run on a 386 processor of a higher end SMP server and is cross platform to a Unix platform and windows NT.

12. The program of claim 10 wherein specifications of each connector listed in said table of available connectors includes a part number and specification for each available connector.

13. The program of claim 10 wherein;

said instruction to display on said monitor includes an instruction to select, from said table of available conductors, those available conductors having specifications matching specifications of said network conductors;

said instruction to select being an instruction to display a pull down menu of available conductors, any one of said available conductors being selectable with an electronic pointer; and said instruction to display on said monitor an instruction to select from said table of available connectors, those available conductors having specifications matching specifications of said network connectors is an instruction to display a pull down menu of available connectors, any one of said available connectors being selectable with said electronic pointer.

14. The program of claim 10 which further includes compiling a bill of materials being a list of selected connectors and conductors.

15. The program of claim 10 wherein each said parameter includes a price per unit of length of said conductor and said specification of each network connector includes a price of said network and said program includes:

an instruction to sum costs of said network connectors to obtain a total cost of said network connectors;

an instruction to multiply each length of said network conductors by price per unit length of said respective conductor providing a cost of each network conductor;

an instruction to add all costs of all said networks providing a total cost of said network connectors;

an instruction to add said cost of said network conductors to said cost of said network connectors providing a total cost of said network;

an instruction to display said total cost with said drawing.

16. The program of claim 10 wherein said instruction G includes a search engine module arranged to match specifications of said network connectors with specifications of said available connectors listed in said table of available connectors.

17. The program of claim 16 wherein said specifications include at least one of subsets wherein each subset is a regional data base belonging to a major category and said search engine is arranged according to a selected major category.

18. The program of claim 17 wherein said major category is at least one of a sex of the connector, a bulkhead, right angle, female, flange, P.C. mount.

19. The program of claim 16 wherein said search engine is arranged to search a data base identified by said specifications to select an appropriate conductor.

20. The program of claim 18 wherein said search for an appropriate conductor includes selecting a desired branch of said network.

21. The program of claim 10 wherein said step H includes the step:

listing in a main menu bar a menu of detailed drawings of said connectors;

displaying said menu permitting a user to select a connector and a drawing depicting the connector to be added to said drawing.

22. The program of claim 10 written in Hyper Text Preprocessor language providing that the program will run on a 386 processor or a higher end SMP server, and is a cross platform to any UNIX platform and Windows NT.

23. A method for enabling a client accessible to a client computer to communicate with a server computer to generate a drawing of a network of at least one conductor and a plurality of network connectors which includes the steps:

A. connecting said server computer to an internet provider connected to said client computer;

B. installing in said client computer a browser program for communication with said server computer;

C installing on said server computer a server program which includes:

a table of connector variables, each connector variable corresponding to one of said network connectors, respectively;

each said connector variable being a list of values, said list of values including at least one of a network connector identification number, an anticipated current load through said connector, coordinates specifying location of said network connector; and an instruction to store those selected part numbers as said values of variables in said table of network connectors;

a table of conductor variables, each conductor variable corresponding to one of said network conductors, respectively;

each said conductor variable including a list of values, said list of values including at least one of a network conductor identification number, an anticipated current load through said network conductor, network connectors to which said network conductor is connected;

a table of available conductors listing type number and parameters of each available conductor;

a table of available connectors including a part number and specifications for each available connector;

an instruction for transmission to said browser said table of available connectors and said table of network connectors;

an instruction for transmission to said browser to display on said client computer an instruction to select, from said table of available connectors, part numbers of available connectors having specification match specifications matching specifications and an instruction to transmit to said browser said table of available conductors and said table of network conductors for display on said client computer;

an instruction for display to said client an instruction directing said client to select from said table of available conductors, those available conductors having specifications matching specifications of said network conductors and adding type numbers of selected available conductors to said table of network conductors;

an instruction to said browser to transmit said table of network conductors and said table of network connectors from said client computer to said server computer;

an instruction to calculate a length of each network conductor from said location of respective network connectors and storing said calculated length with said type and parameters of said respective network conductor in said table of network conductors;

a configure module arranged to apply said location data of each said network connector and said length calculated for each said network conductor to generate a representation of a drawing of said network;

an instruction transmitting said representation of a drawing to said browser whereby said browser generates a drawing of said network for display on a monitor of said client computer;

D transmitting from said client computer through said browser to said server computer an instruction to initiate said program;

E. adding selected part numbers of available connectors and Pratt numbers of available conductors to said tables of network connectors and conductors respectively in response to prompt displayed by said client computer in response to which, said drawing of said network is displayed by said client computer.

24. The method of claim 23 wherein said instruction to display to said client an instruction directing said client to select from said table of available conductors, those available conductors having specifications matching those available conductors having specifications matching specifications of said network conductors and adding type numbers of selected available conductors to said table of network conductors comprises:

using an electronic pointer applied to said monitor of said computer to select said available conductor.

25. The method of claim 23 wherein each said parameter includes:

a price per unit of length of said conductor and said specification of each network connector includes a price of said network and said computer program includes:

an instruction to sum costs of said network connectors to obtain a total cost of said network connectors;

an instruction to multiply each length of said network conductors by a price per unit length of said respective conductor providing a cost of each network conductor;

an instruction to add all costs of all said network connectors providing a total cost of said network connectors;

an instruction to add said cost of said network conductors to said cost of network connectors providing a total cost of said network;

an instruction to transmit said total cost to said browser for displaying said total cost with said drawing.

26. The method of claim 23 wherein said program includes an instruction to compile a bill of materials being a list of all network connectors and network conductors and display said bill of materials on said client monitor.

27. The method of claim 23 wherein said program is presented to said browser in Extensible Hyper Text Mark-up Language.

28. The method of claim 23 wherein said program is written in PHP Hyper Text Preprocessor Language.

29. A program installable on a server computer for enabling a client, accessible to a client computer with a browser, to communicate with said server computer to generate a drawing of a network of at least one conductor and a plurality of network connectors, said program comprising:

a table of connector variables, each connector variable corresponding to one of said network connectors, respectively, each said connector variable being a list of values, said list of values including at least one of a network connector identification number, an anticipated current load through said connector, coordinates specifying location of said network connector;

a table of conductor variables, each conductor variable corresponding to one of said network conductors, respectively, each said conductor variable including a list of values, said list of values including at lest one of a network conductor identification number, an anticipated current load through said network conductor, network connectors to which said network conductor is conneted;

a table of available conductors listing type number and parameters of each available conductor;

a table of available connectors including a part number and specifications for each available connector;

an instruction to transmit to said browser, said table of available connectors and said table of network connectors;

an instruction, for transmission to said browser, to display on said client computer, an instruction to select, from said table of available connectors, part numbers of available connectors having specifications matching specifications, an instruction ro to said browsersaid table of available conductors, and said table of network conductors for display on said client computer;

an instruction for display to said client directing said client to select from said table of available conductors, those available conductors having specifications matching specifications of said network conductors and adding type numbers of selected available conductors to said table of network conductors;

an instruction to said browser to transmit said table of network conductors and said table of network connectors from said client computer back to said server computer;

an instruction to calculate a length of each network conductor from said location of respective network connectors and storing said calculated length with said type and parameters of said respective network conductor in said table of network conductors;

a configure module arranged to apply said location data of each said network connector and said length calculated for each said network conductor to generate a representation of a drawing of said network;

an instruction transmitting said representation of a drawing to said browser whereby said browser generates a drawing of said network for display on a monitor of said client computer;

an instruction to initiate said program transmitted from said client computer through said browser to said client server computer;

adding selected part numbers of available connectors and type numbers of available conductors to said tables of network connectors and conductors respectively in response to prompt displayed by said client computer in response to which, said drawing of said network is displayed by said client computer.

30. The program of claim 29 further comprising an instruction to compile a bill of materials being a list of all network conductors and display said bill of materials on said client monitor.

31. The program of claim 30 wherein said tables of available connectors and said table of available conductors includes for each variable connector and each available conductor a delivery date for said respective available connector and conductor and said program includes an instruction transmitted to said browser to print a schedule of said delivery dates.

32. A method for generating a drawing of a network of at least one interconnect and a plurality of component which includes the steps:

A) composing a schematic representation of said network showing said interconnects linked together by said components;

B) compiling a list of available components including part name, vendor source, load capacity;

C) compiling a list of component variables wherein each component variable represents one of said network components respectively;

D) matching each component with a vendor part number determined by matching anticipated load in said network component with current capacity of an available component;

E) assigning to each component variable a component value wherein each component value is at least one of:
component coordinates defining location of said network component;
component type;
vendor part number;
anticipated capacity value of said network component, respectively;

F,) compiling a list of interconnect variables wherein each interconnect variable represents an interconnect connecting one of said network components to another one of said network components;

G) assigning to each interconnect variable at least one interconnect value of a set of interconnect values, each interconnect value corresponding to one of:
anticipated length of said respective interconnect,
current anticipated in said interconnect,
size of said interconnect,
type of said interconnect;

H) creating a drawing of the network representing relative locations of network components and interconnects connecting said network components wherein each network component is labeled by a respective one of said component variables and said connector is labeled by a respective one of said interconnect variables.

33. The method of claim 32 wherein said component values include component coordinates defining location of said network component; and
said step G includes the step:
calculating said anticipated size from said connector coordinates.

34. The method of claim 33 wherein said interconnect variable includes cost of said interconnect; and
said method further includes the step:
I) compiling a vendor table listing type numbers of available interconnects, each one of said type numbers including capacity and price of said available interconnect respectively; and
step G comprises:
selecting each value of interconnect type number by matching current capacity of one of said available interconnects with anticipated load of said network conductor, respectively;
calculating cost of said network interconnect.

35. The method of claim 34 wherein said component variable includes said part number and price and the method further includes the step in operable order:
J compiling a vendor table listing a part number and price of all available components, each one of said part numbers including operating data of said available component, respectively; and
Step step D includes:
assigning to each network component variable, a part number and price of an available component from said vendor table.

36. The method of claim 35 wherein step G includes listing a price with each part number and the method includes the additional step in operable order:
compiling a list of prices of all network components and interconnects;
adding said list of prices whereby a cost of said network is provided.

37. The method of claim 32 wherein said method includes the step:
compiling a vendor table listing type numbers of all available interconnects, each one of said type numbers; and
said step E comprises:
selecting said type number by matching type number of one of said available interconnects with anticipated current of said network interconnect to select type of said network interconnect.

38. The method of claim 32 wherein said component variable includes said part number and the method further include the step in operable order:
compiling a vendor table listing a part number for each of all available components with a detailed drawing of each available connector, each one of said part numbers including operating data of said available component, respectively; and
step c includes:
assigning to each network component variable, a part number of an available component from said vendor table whose current capacity equals said anticipated current through each said network connector, respectively.

39. A computer program for generating a drawing of a network of at least one interconnect and a plurality of components, which includes:
A. a table of component variables, each component variable corresponding to one of said network components, respectively, each said network variable is a list of values, said list of values including at least one of a network component identification number, an anticipated size requirement by said component, coordinates specifying location of said network component;
B. a table of available components including a part number and specification for each available component;
C. an instruction to display on a monitor of said computer an instruction to select from said table of available components, part numbers of available components having specifications matching specification of said network components and store those selected part numbers as said values of variables in said table of network components;
D. a table of interconnect variables, each interconnect variable corresponding to one of said network interconnects, respectively, each said interconnect variable including a list of values, said list of values including at least one of a network interconnect identification number, an anticipated size required by said network interconnect, network components to which said network interconnect is connected;
E. a table of available interconnects listing type number and parameters of each available interconnect;
F. an instruction to display said table of available interconnects and said table of network interconnects for display on said monitor of said computer;
G. an instruction for display on said monitor to select from said table of available interconnects, those available interconnects having specifications matching specifications of said network interconnects and adding type numbers of selected available interconnects to said table of network interconnects;
H. an instruction to display said table of network interconnects and said table of network components on said monitor of said computer;
I. an instruction to generate a drawing of said network for display on a monitor of said computer.

40. The program of claim 39 written in hyper test Preprocessor language providing that said program will run on a 386 processor or a higher end SMP sever and is cross platform to a UNIX platform and Windows NT.

41. The program of claim 39 wherein specification of each component listed in said table of available components includes a part number and specification for each available component.

42. The program of claim 39 wherein said instruction to display on said monitor an instruction to select from said table of available interconnects, those available interconnects having specifications matching specifications of said network interconnects is an instruction to display a pull down menu of available interconnects, any one of said available interconnects being selectable with an electronic pointer; and
said instruction to display on said monitor an instruction to select from said table of available components those available components having specifications matching specifications of said network components is an instruction to display a pull down menu of available components, any one of said available components being selectable with said electronic pointer.

43. The program of claim 39 which further includes compiling a bill of materials being a list of all selected components and interconnects.

44. The program of claim 39 wherein each said parameter includes price for each said conductor and said specification of each network component includes a price of said network and said program includes:
an instruction to sum costs of said network components to obtain a total cost of said network components;
an instruction to provide a cost of each network interconnect;
an instruction to add all costs of all said network components providing a total cost of said network components;
an instruction to add said cost of said network interconnects to said cost of said network components providing a total; cost of said network;
an instruction to display said total cost with said drawing.

45. The program of claim 39 wherein said instruction G includes a search engine module arranged to match specifications of said network components with specifications of said available components listed in said table of available components.

46. The program of claim 45 wherein said specifications include at least one of subsets wherein each subset if a regional data base belonging to a major category and said search engine is arranged to search according to a selected major category.

47. The program of claim 45 wherein said search engine searches a data base identified by said specifications to select an appropriate conductor.

48. The program of claim 39 wherein said search for an appropriate conductor includes selecting a desired branch of said network.

49. The program of claim 39 wherein said step H includes the step:

listing in a main menu bar a menu of detailed drawings of said components;

displaying said menu permitting a user to select a component having a drawing depicting the component to be added to said drawing.

50. The program of claim 39 written in Hyper Text text Preprocessor language proviing that the program will run on a 386 or a higher end SMP server, and is cross platform to any Unix platform and Windos NT.

51. A method for enabling a client accessible to a client computer to communicate with a server computer to generate a drawing of a network of at least one interconnect and a plurality of components which includes the steps:

A) connect said server computer to an Internet provider connected to said client computer;

install in said client computer a browser program for communication with said server computer;

install on said server computer a program which includes:

a table of component variables, each component variable corresponding to one of said network components, respectively, each said component variable being a list of values, said list of values including at least one of a network component identification number, an anticipated size required by said connector, coordinates specifying location of said network component; and said selected part numbers stored as said values of variables in said table of network components;

a table of interconnect variables, each interconnect variable corresponding to one of said network interconnects, respectively, each said interconnect variable including a list of values, said list of values including at least one of a network interconnect identification number, network components to which said network component is connected;

a table of available interconnects, listing type numbers and parameters of each available interconnect;

a table of available components including a part number and specifications for each available component;

an instruction to transmit to said browser said table of available components and said table of network components;

an instruction for transmission-to said browser to display on said client computer an instruction to select from said table of avaiable components having specifications matching specifications an instruction to transmit to seid browser said table of available interconnects and said table of network interconnects for display on said client computer;

an instruction for display to said client, an instruction directing said client to select from said table of available interconnects, those available interconnects having specifications matching specifications of said network conductors and adding type numbers of selected available interconnects to said table of network interconnects;

an instruction to said browser to transmit said table of network interconnects and said table of network components from said client computer back to said server computer;

an instruction to calculate a size of each network interconnect from said location of respective network component and storing said calculated size with said type and parameters of said respective network interconnect in said table of network interconnects;

a configure module arranged to apply said location data of each said network component and said size calculated for each said network interconnect to generate a representation of a drawing of said network;

an instruction transmitting said representation of a drawing to said browser whereby said browser generated s drawing of said network for display on a monitor of said client computer;

D transmitting an instruction to initiate said program from said client computer through said browser to said server computer;

adding selected part numbers of available components and type numbers of available interconnects to said tables of network components and interconnects respectively in response to a prompt displayed by said client computer, in response to which, said drawing of said network is displayed by said client computer.

52. The method of claim 51 wherein said instruction to display to said client an instruction directing said client to select from said table of available interconnects, those available interconnects having specification matching specifications of said network interconnects and adding type numbers of selected available interconnects to said table of network interconnects to said table of network interconnects comprises using an electronic pointer applied to said monitor of said computer to select said available interconnect.

53. The method of claim 51 wherein each said parameter includes a unit price of said interconnect and said specification of each network component includes a price of said network and said program includes:

an instruction to sum costs of said network components to obtain a total cost of said network components;

an instruction to provide a cost of each network interconnect;

an instruction to add all costs of all said network components providing a total cost of said network components;

an instruction to add said cost of said networks interconnects to said total cost of said network components providing a total cost of said network;

transmitting said total cost to said browser for displaying said total cost with said drawing.

54. The method of claim 51 wherein said program includes an instruction to compile a bill of materials being a list of all network components and network interconnects and display said bill of materials on said client monitor.

55. The method of claim 51 wherein said program is presented to said browser in Extensible Hyper Text Mark-up Language.

56. The method of claim 51 wherein said program is written in PHP hyper Text Preprocessor Language.

57. A program installable on a server computer for enabling a client accessible to a client computer to communicate with said server computer to generate a drawing of a network of at least one conductor and a plurality of connectors, said program comprising:

a table of component variables, each component variable corresponding to one of said network components, respectively, each said network variable being a list of values, said list of values including at least one of a network component identification number, an anticipated current load through said component, coordinates specifying location of said network component of said network components, and selected part numbers stored as said values of variables in said table of network components;

a table of interconnect variables, each interconnect variable corresponding to one of said network interconnects, respectively, each said interconnect variable including a list of values, said list of values including at least one of a network interconnect identification number, an anticipaed size required by said network interconnect, and network components to which said network interconnect is connected;

a table of available interconnects listing type number and parameters of each available interconnect;

a table of available components including a part number and specifications for each available component;

an instruction to transmit to said browser said table of available connectors and said table of network connectors;

an instruction for transmission to said browser to display on said client computer an instruction to select from said table of available components, part numbers of available components having specifications matching specifications of said network components, an instruction to transmit to said browser said table of available interconnects and said table of network interconnects for display on said client computer;

an instruction for display to said client an instruction directing said client to select from said table of available interconnects, those available interconnects having specifications matching specifications of said network interconnects and adding type numbers of selected available interconnects to said table of network interconnects;

an instruction to said browser to transmit said table of network interconnects and said table of network components from said client computer back to said sever computer;

an instruction to calculate a price of each network interconnect from said type and parameters of said respective network interface in said table of network interconnects;

a configure module arranged to apply said location data of each said network component to generate a representation of a drawing of said network;

an instruction transmitting said representation of said drawing to said browser whereby said browser generates a drawing of said network for display on a monitor of said client computer;

an instruction for transmitting an instruction from said client computer through said browser to said server computer an instruction to initiate said program;

adding selected part numbers of available components and type numbers of available interconnects to said tables of network components and interconnects respectively in response to prompt displayed by said client computer, in response to which, said drawing of said network is displayed by said client computer.

58. The program of claim 57 further comprising an instruction to compile a bill of materials being a list of all network components and network interconnects and displaying said bill of materials on said client monitor.

59. The program of claim 57 wherein said table of available components and said table of available components includes, for each available component and each available interconnect a delivery date for said respective available interconnect and component and said program includes an instruction transmitted to said browser to print a schedule of said delivery dates.

* * * * *